Nov. 10, 1925.
A. W. OLDS
1,560,844
MEANS FOR OPERATING AUTOMOBILE SPEED SIGNALS
Filed July 31, 1922
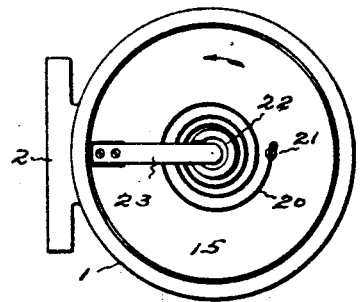
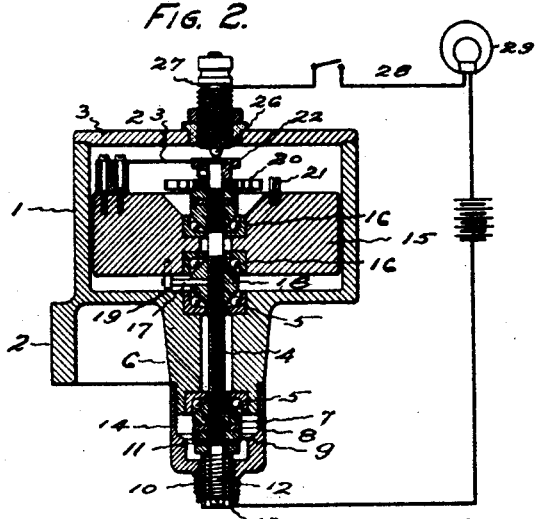
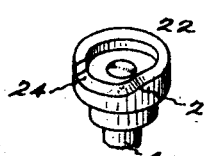
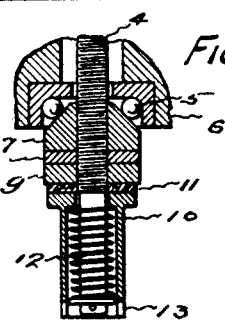
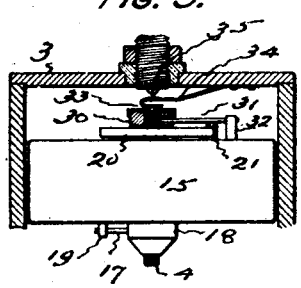
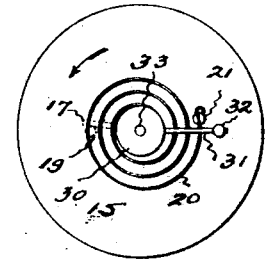
INVENTOR
Alfred W. Olds
by Harry R. Williams
atty.

Patented Nov. 10, 1925.

1,560,844

UNITED STATES PATENT OFFICE.

ALFRED W. OLDS, OF WINDSOR, CONNECTICUT.

MEANS FOR OPERATING AUTOMOBILE SPEED SIGNALS.

Application filed July 31, 1922. Serial No. 578,839.

*To all whom it may concern:*

Be it known that I, ALFRED W. OLDS, a citizen of the United States, residing at Windsor, in the county of Hartford and State of Connecticut, have invented a new and useful Improvement in Means for Operating Automobile Speed Signals, of which the following is a specification.

This invention relates to those apparatus which are designed to be applied to pleasure and commercial automobiles for automatically causing a light, sign or other warning signal to indicate change in the rate of travel of the vehicle.

The object of the invention is to provide an inexpensive, effective and sensitive apparatus of this character which can be readily applied to an automobile and connected with a rotating part of the vehicle so as to act in consonance therewith, and be connected in an electric circuit which includes a light, sign or other warning signal, in such manner that when the vehicle is traveling at a uniform speed or at an increasing speed the circuit will be open, but at all times, no matter at what rate the vehicle is traveling, when the speed is reduced the circuit will be closed and the light, sign or signal light give warning of the reduction of speed. And further to provide means whereby the driving shaft is relieved of shock when starting or stopping, and the signal indication will continue for a definite period when the apparatus functions.

In the embodiment of the invention that is illustrated there is a spindle which is designed to be connected with and rotated by some rotating element of the vehicle, a weighted member, wheel or pulley, loosely mounted on the spindle, with a connection between these which drives the wheel forward with the spindle but permits the wheel under its momentum to run faster than the spindle when the speed of the latter is retarded, and means moved as a result of any difference between the speed of the rotation of the wheel and rotation of the spindle, for closing and opening the signal circuit. This spindle is provided with means for the attachment of a driving shaft which means will slip or yield so that the actions of the apparatus will take place without shock or rebound.

In the accompanying drawings Figure 1 shows a plan of one form of the operating device with the casing cover removed. Fig. 2 shows a central vertical section of the same. Fig. 3 shows on larger scale a section of the outer end of the spindle and the means by which it is designed to be connected with a driving shaft. Fig. 4 is a view of an actuating cam that may be applied to the spindle in this form of the invention. Fig. 5 is a section of a portion of the device with a modified arrangement of circuit controlling means. Fig. 6 is a plan of the fly wheel of this modified form. Fig. 7 is a detail showing another arrangement of circuit closing means.

The device illustrated is enclosed in a cylindrical casing 1 that is provided with a bracket 2 by means of which it may be attached to the vehicle and a cover 3 which may be removed to permit access to the interior of the casing. This spindle 4 is mounted to turn freely on anti-friction bearings 5 set in a hub 6 that projects from the casing. The bearing cone 7 is screwed onto the lower end of the spindle and under this cone is a washer 8 and a lock nut 9. Loosely mounted on the lower end of the spindle is a thimble 10 between the upper end of which and the lock nut is a friction washer 11 preferably of cork. The thimble is pressed upwardly by a spring 12. The lower end of the thimble is notched, as at 13, for the attachment of a coupling on the end of a flexible driving shaft. A cap 14 is screwed onto the hub over this lower bearing and the friction clutch.

Rotatably mounted on the spindle is a fly wheel 15, there being anti-friction bearings 16 between the fly wheel and the spindle. In the construction shown there is a pin 17 projecting outwardly from the bearing cone 18 that is fastened to the spindle, which pin is adapted to engage a stud 19 projecting downwardly from the fly wheel in such manner that when the spindle is rotated forwardly the pin engages the stud and drives the fly wheel, but the fly wheel is free to run ahead of the spindle one revolution.

A spring 20 has one end connected with the spindle and its other end fastened to a stud 21 screwed into the fly wheel. This spring is arranged to yieldingly hold the fly wheel in such relation to the spindle that the pin 17 is normally engaged with the stud 19. The spring allows the fly wheel to run ahead of the spindle but returns the parts to normal position when the speed of the fly wheel is reduced to that of the spindle.

In the form first shown a cam 22 is attached to the upper end of the spindle and a spring finger 23 is fastened to the fly wheel in such manner that its free end will rest upon the edge of the cam. With the parts in their normal position and the fly wheel rotating at the same speed as the spindle, the end of the spring lies in the cut-down section 24 of the cam. When the fly wheel rotates faster than the spindle the spring finger rides up on the incline 25 of the cam. When the spring finger is raised by the cam it is caused to engage with the terminal 26 of the binding post 27 so as to close the circuit 28 through the signaling means 29, which may be a lamp, or any other well known sign or warning signal.

When the spindle is rotated it drives the fly wheel forward through the engagement of the pin 17 with the stud 19. At all times, regardless of the actual rate of speed of the vehicle, when the speed is reduced and the rotation of the spindle slackened the fly wheel, due to its momentum runs ahead of the spindle, and as it runs ahead of the spindle the cam on the end of the spindle lifts the spring finger carried by the fly wheel into engagement with the terminal contact and closes the circuit so that the signal will give warning of the reduction of speed of the vehicle. If the speed of the vehicle is high and the momentum of the fly wheel is considerable the spindle is carried around after the fly wheel has made one complete revolution, by the engagement of the pin and stud, the friction clutch which is at the end of the spindle and which is designed to be connected with the driving shaft, permitting this. When the momentum of the fly wheel has been expended and its speed reduced to that of the spindle it is returned by the spring so that the driving pin and stud are again in contact. As it is returned to normal position the spring finger rides down the cam and opens the circuit, showing that the vehicle after slowing down, has either resumed uniform speed or has stopped.

As shown in Fig. 5 the upper end of the spindle can be threaded and provided with a nut 30 having a finger 31 connected with a stud 32 fastened to the fly wheel. On this nut is a contact 33 which engages a spring finger 34 fastened to the cover. With this construction when the fly wheel moves faster than the spindle the nut is turned on the threaded end of the spindle and raised so as to press the end of the spring finger 34 into engagement with the circuit terminal 35. When the fly wheel speed is reduced to that of the spindle the spring 20 returns it to normal position and the return movement lowers the nut and opens the circuit. An advantage of this form is that the circuit is opened and closed between two parts that are fixed to the cover and do not rotate.

As shown in Fig. 7 the spring finger contact 36 could be applied directly to the nut 37 in such position that when the nut is raised by the excess speed of the fly wheel over that of the spindle, the spring finger is engaged with the circuit terminal 26. When the fly wheel and spindle are rotating at the same speed the nut is drawn down so as to open the circuit.

With all of these forms whenever the rotation of the spindle is retarded by the slowing down of the vehicle the fly wheel runs ahead under its momentum and closes the circuit so as to cause the signal to give warning of the fact that the vehicle is reducing speed. The device is very sensitive as the fly wheel has considerable weight and is mounted upon anti-friction bearings. There is no shock when the structure is started moving nor when it functions, owing to the slippage provided by the friction clutch at the end of the spindle, and owing to the same factor there is no rebound of the parts when the spring returns the fly wheel. Furthermore owing to the slippage of the clutch when the wheel runs ahead the warning signal is continued for a longer period than would otherwise be the case.

The invention claimed is:

1. Means for operating an automobile speed signal comprising a rotatory spindle adapted to be driven from the vehicle, a weighted member rotatably mounted on and adapted to be driven forwardly by the spindle but free to rotate ahead of the spindle due to its momentum when the rotation of the spindle is retarded, a spring connecting the weighted member and the spindle and tensioned to rotate the weighted member backward after it has run ahead of the spindle and its excess momentum has been exhausted, a fixed circuit terminal, a circuit contact, and means on the end of the spindle adapted to press said contact into engagement with said terminal when the weighted member due to its momentum rotates faster than the spindle.

2. Means for operating an automobile speed signal comprising a rotatory spindle adapted to be driven from the vehicle, a weighted member rotatably mounted on and adapted to be driven forwardly by the spindle but free to rotate ahead of the spindle due to its momentum when the rotation of the spindle is retarded, a spring connecting the weighted member and the spindle and tensioned to rotate the weighted member backward after it has run ahead of the spindle and its excess momentum has been exhausted, a fixed circuit terminal, a circuit contact carried by the weighted member, and means attached to the end of the spindle adapted to press said contact into engagement with said terminal when the weighted member due to its momentum runs faster than the spindle.

3. Means for operating an automobile speed signal comprising a rotatory spindle adapted to be driven from the vehicle, a weighted member rotatably mounted on and adapted to be driven forwardly by the spindle but free to run ahead of the spindle due to its momentum when the rotation of the spindle is retarded, a spring connecting the weighted member and the spindle and tensioned to rotate the weighted member backward after it has run ahead of the spindle and its excess momentum has been exhausted, a fixed circuit terminal, a circuit contact carried by the weighted member, and a cam attached to the end of the spindle and adapted to press said contact into engagement with said terminal when the weighted member due to its momentum runs faster than the spindle.

ALFRED W. OLDS.